United States Patent
Taguchi

(10) Patent No.: US 7,394,620 B2
(45) Date of Patent: Jul. 1, 2008

(54) PERPENDICULAR MAGNETIC RECORDING HEAD AND MAGNETIC DISC APPARATUS

(75) Inventor: Tomoko Taguchi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 453 days.

(21) Appl. No.: 10/804,022

(22) Filed: Mar. 19, 2004

(65) Prior Publication Data
US 2004/0212923 A1    Oct. 28, 2004

(30) Foreign Application Priority Data
Apr. 28, 2003    (JP)    ............... 2003-124116

(51) Int. Cl.
*G11B 5/127*    (2006.01)
(52) U.S. Cl. .................................... 360/125
(58) Field of Classification Search ........... None
See application file for complete search history.

(56) References Cited

U.S. PATENT DOCUMENTS

| | | | |
|---|---|---|---|
| 4,873,599 A | 10/1989 | Sueoka | |
| 5,168,409 A | 12/1992 | Koyama et al. | |
| 5,311,387 A * | 5/1994 | Mallary | 360/126 |
| 6,697,221 B2 * | 2/2004 | Sato et al. | 360/126 |
| 6,954,340 B2 * | 10/2005 | Shukh et al. | 360/317 |
| 7,075,756 B1 * | 7/2006 | Mallary et al. | 360/317 |
| 2001/0017746 A1* | 8/2001 | Nishida et al. | 360/125 |
| 2002/0036863 A1 | 3/2002 | Takeo et al. | |
| 2002/0036871 A1 | 3/2002 | Yano et al. | |
| 2002/0176214 A1* | 11/2002 | Shukh et al. | 360/317 |
| 2003/0026039 A1 | 2/2003 | Okada et al. | |
| 2003/0043513 A1* | 3/2003 | Lin | 360/317 |

FOREIGN PATENT DOCUMENTS

| | | |
|---|---|---|
| JP | 62-052710 | 3/1987 |
| JP | 2002-10007 | 4/2002 |
| JP | 2004-103204 | 4/2004 |
| JP | 2004-199816 | 7/2004 |

OTHER PUBLICATIONS

Japanese Office Action dated Jan. 27, 2006 for Appln. No. 200410031552.5.
Japanese Office Action dated Sep. 20, 2005 for Appln. No. 2003-124116.
Japanese Office Action dated 2003-124116 for Appln. No. 2003-124116.
Austrian Patent Office Search Report for Application No. 200401343-9 dated Sep. 10, 2004.

* cited by examiner

*Primary Examiner*—Joseph Feild
*Assistant Examiner*—Mark Blouin
(74) *Attorney, Agent, or Firm*—Pillsbury Winthrop Shaw Pittman, LLP

(57) ABSTRACT

A magnetic disc apparatus includes a double layered perpendicular recording medium including a soft magnetic underlayer and a perpendicular recording layer, which are formed on a substrate, and a perpendicular magnetic recording head including a main pole generating a recording magnetic field in a perpendicular direction, and an auxiliary pole connected to the main pole on a trailing side to the main pole and having a multilayered structure in which a nonmagnetic layer is sandwiched between magnetic layers.

6 Claims, 10 Drawing Sheets

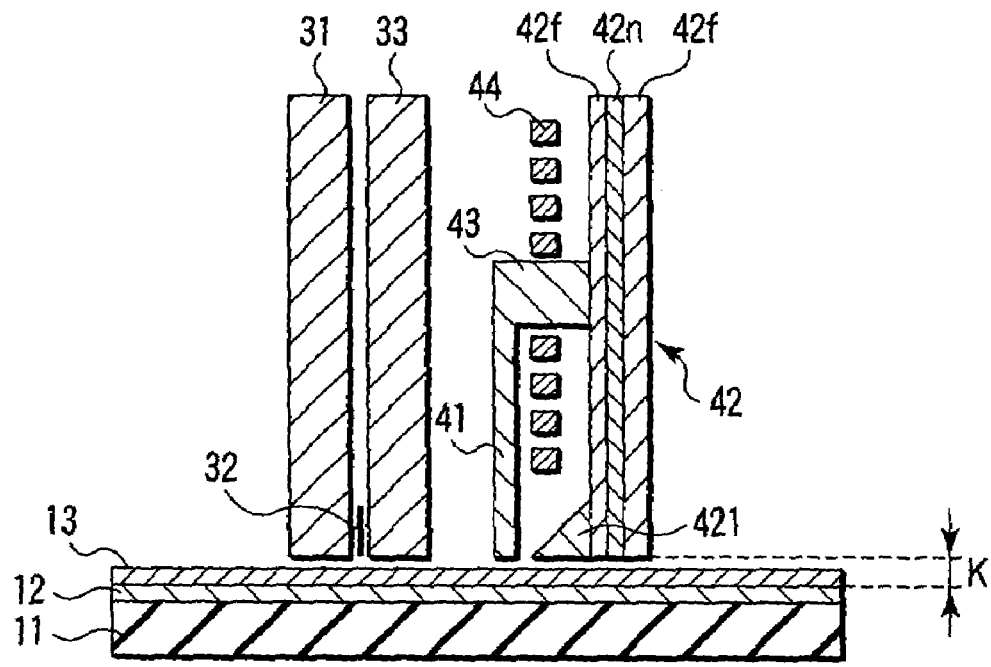
F I G. 3
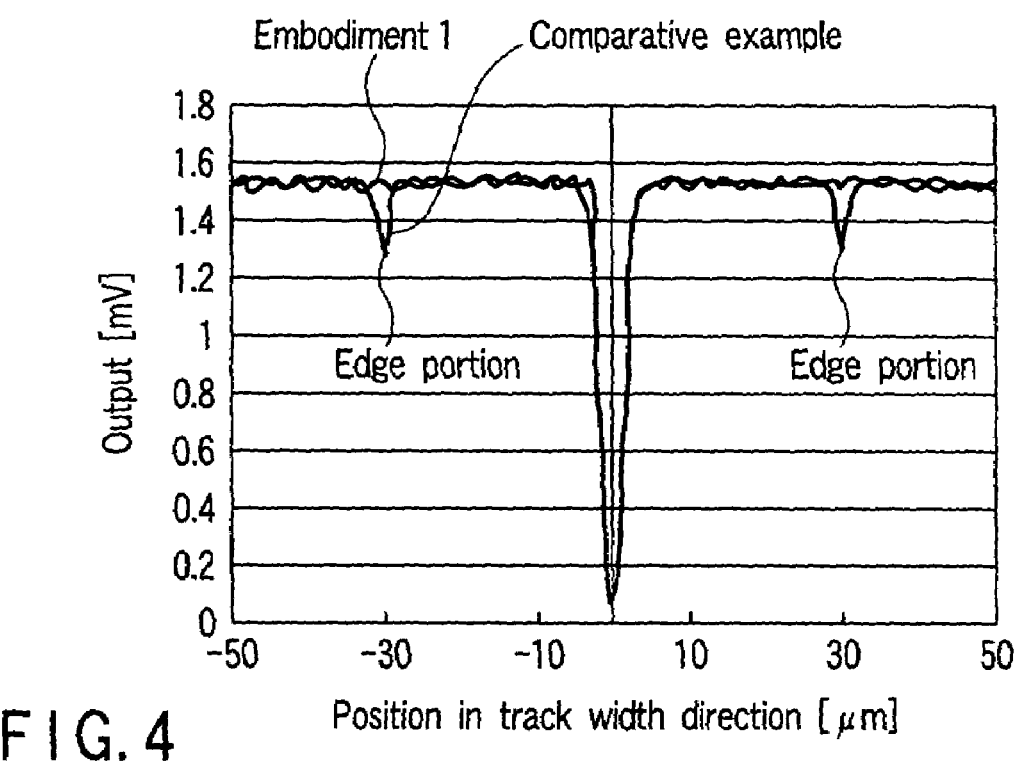
F I G. 4

PERPENDICULAR MAGNETIC RECORDING HEAD AND MAGNETIC DISC APPARATUS

CROSS-REFERENCE TO RELATED APPLICATIONS

This application is based upon and claims the benefit of priority from prior Japanese Patent Application No. 2003-124116, filed Apr. 28, 2003, the entire contents of which are incorporated herein by reference.

BACKGROUND OF THE INVENTION

1. Field of the Invention

The present invention relates to a perpendicular magnetic recording head and a magnetic disc apparatus using the perpendicular magnetic recording head.

2. Description of the Related Art

A conventional magnetic disc apparatus of a perpendicular recording system has a double layered perpendicular magnetic recording medium comprising a soft magnetic underlayer made of a high permeability material and a perpendicular recording layer having a magnetic anisotropy in the direction perpendicular to the film plane thereof, which are formed on a disc substrate, and a single-pole recording head including a main pole and an auxiliary pole each made of a high permeability material. The auxiliary pole serves to efficiently conduct a magnetic flux during a recording operation.

When the conventional magnetic disc apparatus of a perpendicular recording system is required to achieve a higher recording density, a serious problem is generated that signals recorded in the recording medium previously are deteriorated or erased by a weak magnetic field leaked from the auxiliary pole during a recording operation.

Incidentally, U.S. Pat. No. 4,873,599 discloses a technique that uses an auxiliary pole whose permeability progressively increases from each edge to the center thereof in the moving direction of the head, in order to overcome the increase in pulse noise generation in the edge of the auxiliary pole. In this technique, however, it is impossible to basically overcome the above-noted problem of the deterioration and erasure of the signals already recorded in the recording medium.

Also, since the conventional single-pole recording head has high sensitivity to a disturbance magnetic field, it is possible that the disturbance magnetic field brings about deterioration and erasure of previously recorded information. Thus, a structure that a write shield is arranged on the trailing side to the single-pole recording head is proposed to suppress penetration of the disturbance magnetic field (see U.S. Pat. No. 5,311,387). The particular structure makes it possible to prevent the signal deterioration in a region right under the main pole. However, the structure gives rise to a problem that a magnetic field generated from the main pole during a recording operation is introduced into the write shield to cause a weak leakage field from the write shield, which deteriorates or erases the previously recorded signals.

BRIEF SUMMARY OF THE INVENTION

A perpendicular magnetic recording head according to an aspect of the present invention comprises: a main pole configured to generate a recording magnetic field in a perpendicular direction; and an auxiliary pole connected to the main pole on a trailing side to the main pole and having a multilayered structure in which a nonmagnetic layer is sandwiched between magnetic layers.

A perpendicular magnetic recording head according to another aspect of the present invention comprises: a main pole configured to generate a recording magnetic field in a perpendicular direction; an auxiliary pole connected to the main pole on a leading side to the main pole; and a write shield arranged apart from the main pole on a trailing side to the main pole and having a multilayered structure in which a nonmagnetic layer is sandwiched between magnetic layers.

A magnetic disc apparatus according to another aspect of the present invention comprises: a double layered perpendicular recording medium comprising a soft magnetic underlayer and a perpendicular recording layer, which are formed on a substrate; and a perpendicular magnetic recording head comprising a main pole configured to generate a recording magnetic field in a perpendicular direction, and an auxiliary pole connected to the main pole on a trailing side to the main pole and having a multilayered structure in which a nonmagnetic layer is sandwiched between magnetic layers.

A magnetic disc apparatus according to another aspect of the present invention comprises: a double layered perpendicular recording medium comprising a soft magnetic underlayer and a perpendicular recording layer, which are formed on a substrate; and a perpendicular magnetic recording head comprising a main pole configured to generate a recording magnetic field in a perpendicular direction, an auxiliary pole connected to the main pole on a leading side to the main pole, and a write shield arranged apart from the main pole on a trailing side to the main pole and having a multilayered structure in which a nonmagnetic layer is sandwiched between magnetic layers.

In the present invention, the write shield may have such a thickness that is thicker in each of edge portions than in a central portion or may have such a number of stacks of the magnetic layer and the nonmagnetic layer that is larger in each of edge portions than in a central portion.

BRIEF DESCRIPTION OF THE SEVERAL VIEWS OF THE DRAWING

FIG. 3 is a vertical sectional view showing the magnetic head in FIG. 1, which is sectioned perpendicularly to the magnetic disk in the track direction at the center position of the main pole;

FIG. 4 is a graph showing output profiles in the track width direction where the magnetic head of Embodiment 1 or Comparative Example thereof is used;

DETAILED DESCRIPTION OF THE INVENTION

Figure 1:
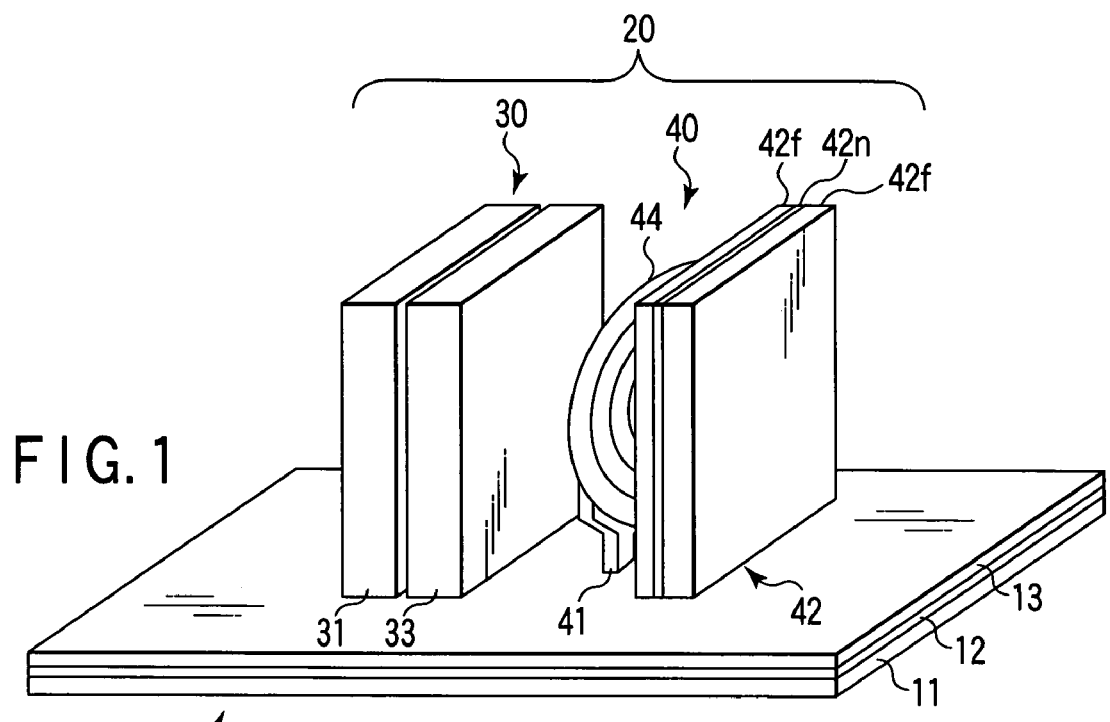
FIG. 1 is a perspective view showing the magnetic head and the magnetic disc used in the perpendicular magnetic disc apparatus according to Embodiment 1 of the present invention.

The present inventor has conducted research to clarify why a leakage field is generated from the auxiliary pole or the write shield during a recording operation. It has been found that large magnetic domains are probably formed in the edge portions in the track width direction of the auxiliary pole or the write shield, where the magnetic field is concentrated, bringing about a leakage field. It was therefore expected that it would be effective to reduce the magnetic domains in order to suppress the leakage field from the auxiliary pole or the write shield.

In an embodiment of the present invention, the auxiliary pole is connected to the main pole on a trailing side to the main pole and has a multilayered structure in which a nonmagnetic layer is sandwiched between magnetic layers. The particular auxiliary pole makes it possible to reduce the magnetic domains in both edge portions thereof in the track width direction so as to suppress the leakage field during the recording operation, with the result that it is possible to prevent the previously recorded signals from being deteriorated and erased.

It suffices for the auxiliary pole to be of a three-layer structure in which a magnetic layer, a nonmagnetic layer and another magnetic layer are stacked. However, it is also possible to increase the number of stacks of the magnetic layer and the nonmagnetic layer so as to further reduce the magnetic domains formed in the edge portions of the auxiliary pole in the track width direction.

In another embodiment of the present invention, a write shield is arranged apart from the main pole on the trailing side to the main pole, and the write shield is formed into a multilayered structure in which a nonmagnetic layer is sandwiched between magnetic layers. The particular write shield makes it possible to reduce the magnetic domains in both edge portions thereof in the track width direction so as to suppress the leakage field during the recording operation, with the result that it is possible to prevent the previously recorded signals from being deteriorated and erased.

It suffices for the write shield to be of a three-layer structure in which a magnetic layer, a nonmagnetic layer and another magnetic layer are stacked. However, it is also possible to increase the number of stacks of the magnetic layer and the nonmagnetic layer so as to further reduce the magnetic domains in the edge portions of the write shield in the track width direction.

In the present invention, the material of the magnetic layer used for the auxiliary pole or the write shield includes soft magnetic materials such as a Co-based magnetic alloy, Permalloy and Sendust. In the present invention, the material of the nonmagnetic layer used for the auxiliary pole or the write shield includes titanium (Ti), ruthenium (Ru), tantalum (Ta), gold (Au), platinum (Pt), copper (Cu) and carbon (C), which are highly wettable with the aforementioned soft magnetic material. It is also possible to use $SiO_2$ or alumina ($Al_2O_3$) as the material of the nonmagnetic layer.

Embodiments of the present invention will now be described with reference to the accompanying drawings.

Embodiment 1

Figure 2:
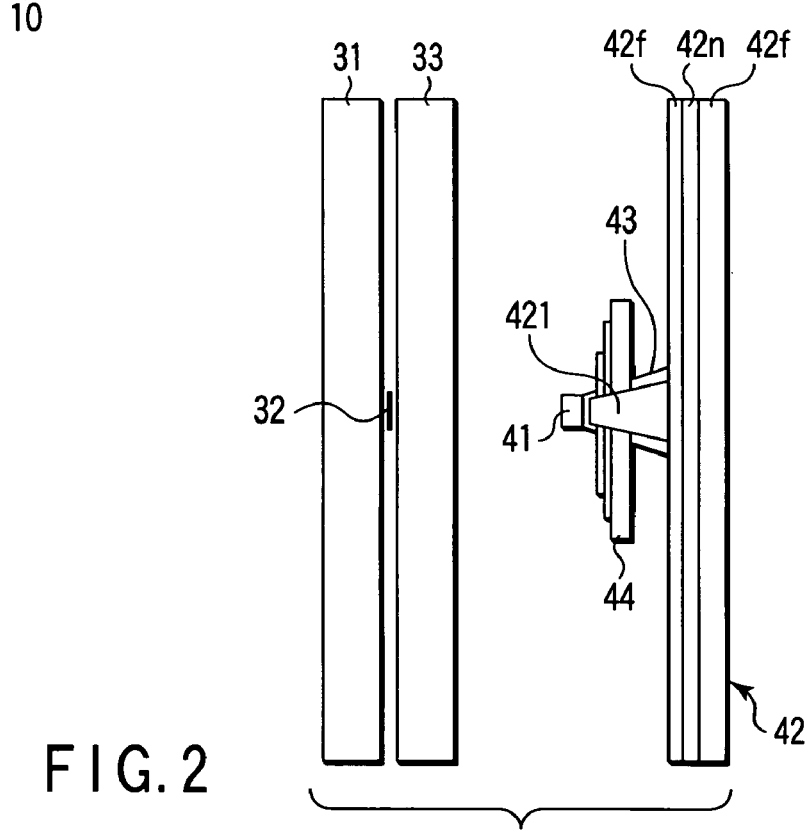
FIG. 2 is a plan view showing the magnetic head in FIG. 1 as viewed from the air-bearing surface (ABS)

FIG. 1 is a perspective view showing the magnetic head and the magnetic disc used in the perpendicular magnetic recording apparatus according to Embodiment 1 of the present invention. FIG. 2 is a plan view showing the magnetic head in FIG. 1 as viewed from the air-bearing surface (ABS). FIG. 3 is a vertical sectional view showing the magnetic head in FIG. 1, which is sectioned perpendicularly to the magnetic disc in the track direction at the center position of the main pole.

The magnetic disc 10 includes the disc substrate 11 and the soft magnetic underlayer 12 and the perpendicular recording layer 13 having an anisotropy in a direction perpendicular to the disc plane, which are formed on the substrate 11.

The magnetic head 20, which is a separate type magnetic head, includes the read head 30 and the write head 40 which are formed separately on a head substrate (not shown). The read head 30 includes the lower shield 31, the read element 32, e.g., a giant magnetoresistive element (GMR element), and the upper shield 33. The GMR element 32 is arranged within the read gap formed between the lower shield 31 and the upper shield 33. The write head 40 includes the main pole 41 and the auxiliary pole 42 arranged on the trailing side to the main pole 41, which are connected by the connecting section 43. The coil 44 is wound around the connecting section 43. The main pole 41 generates a recording magnetic field in a direction perpendicular to the magnetic disc. The auxiliary pole 42 has a multilayered structure in which a magnetic layer 42f, a nonmagnetic layer 42n and another magnetic layer 42f are stacked. The tip section 42f of the auxiliary pole 42 is formed to project toward the main pole 41 so as to approach the main pole 41.

As shown in FIG. 3, the shortest distance between the surface of the soft magnetic underlayer 12 of the magnetic disc 10 and the main pole 41 or the auxiliary pole 42 is expressed by K. In order to optimize the recording efficiency, the shortest distance between the main pole 41 and the tip section 421 of the auxiliary pole 42 should be designed to be about 1 to 5 times as much as K.

In the present Embodiment, since the auxiliary pole 42 formed on the trailing side to the main pole 41 is formed into a multilayered structure in which the nonmagnetic layer 42*n* is sandwiched between the two magnetic layers 42*f* and 42*f*, it is possible to reduce the magnetic domains in the edge portions in the track width direction of the auxiliary pole 42 so as to suppress the leakage field during the recording operation, making it possible to prevent the previously recorded signals from being deteriorated and erased.

Now, results of experiments, conducted for confirming the aforementioned effect, will be described. A magnetic head for Embodiment 1 shown in FIGS. 1 to 3 was fabricated as follows. The shortest distance between the main pole 41 and the auxiliary pole 42 of the magnetic head was designed to be 0.2 μm. The auxiliary pole 42 had a thickness of 2 μm, a height of 15 μm and a width of 40 μm. As a Comparative Example, a magnetic head having a structure similar to that shown in FIGS. 1 to 3, except that the auxiliary pole was formed of a single magnetic layer, was fabricated.

Perpendicular magnetic recording was performed with each of the magnetic heads. The flying height of the magnetic head was controlled to provide 0.1 μm of the distance between the main pole 41 and the surface of the soft magnetic underlayer 12 of the magnetic disc 10. In the first step, signals were recorded over the entire surface of the magnetic disc 10 with a single frequency of 40 MHz. Then, signals were repeatedly recorded 1,000 times in a target track with a frequency of 150 MHz. Further, the signals recorded first were reproduced from the tracks positioned within a range of ±50 nm in the radial direction from the target track. FIG. 4 is a graph showing profiles of the detected output [mV] in the track width direction (radial direction).

As shown in FIG. 4, in the case of using the magnetic head for the Comparative Example, a deterioration of about 14% in the output was observed in the tracks corresponding to the edge portions of the auxiliary pole in the track width direction while the recording was performed on the target track. On the other hand, in the case of using the magnetic head for Embodiment 1, the deterioration in the output was low, i.e., about 1.1%.

Figure 5:
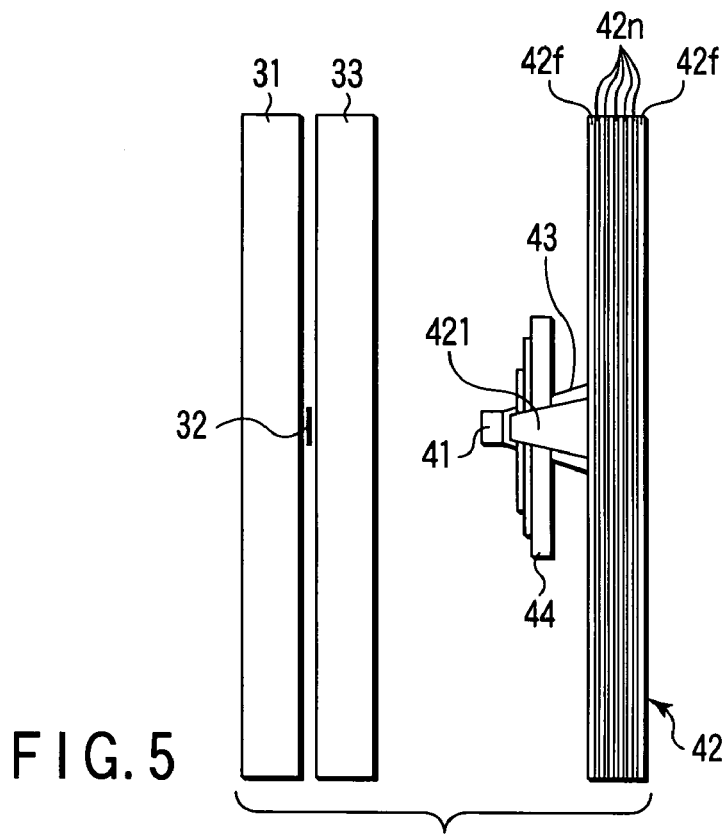
FIG. 5 is a plan view showing a magnetic head according to a modification for Embodiment 1 as viewed from the ABS.

FIG. 5 is a plan view showing the magnetic head according to a modification for Embodiment 1 as viewed from the ABS. In this modification, the auxiliary pole 42 arranged on the trailing side to the main pole 41 is formed into a stacked structure in which six magnetic layers 42*f* and five nonmagnetic layers 42*n* are alternately stacked. Where the number of magnetic layers 42*f* and nonmagnetic layers 42*n* forming the auxiliary pole 42 are increased as in the modification compared with Embodiment 1, it is possible to suppress more effectively the leakage field from the both edge portions of the auxiliary pole 42.

Embodiment 2

Figure 6:
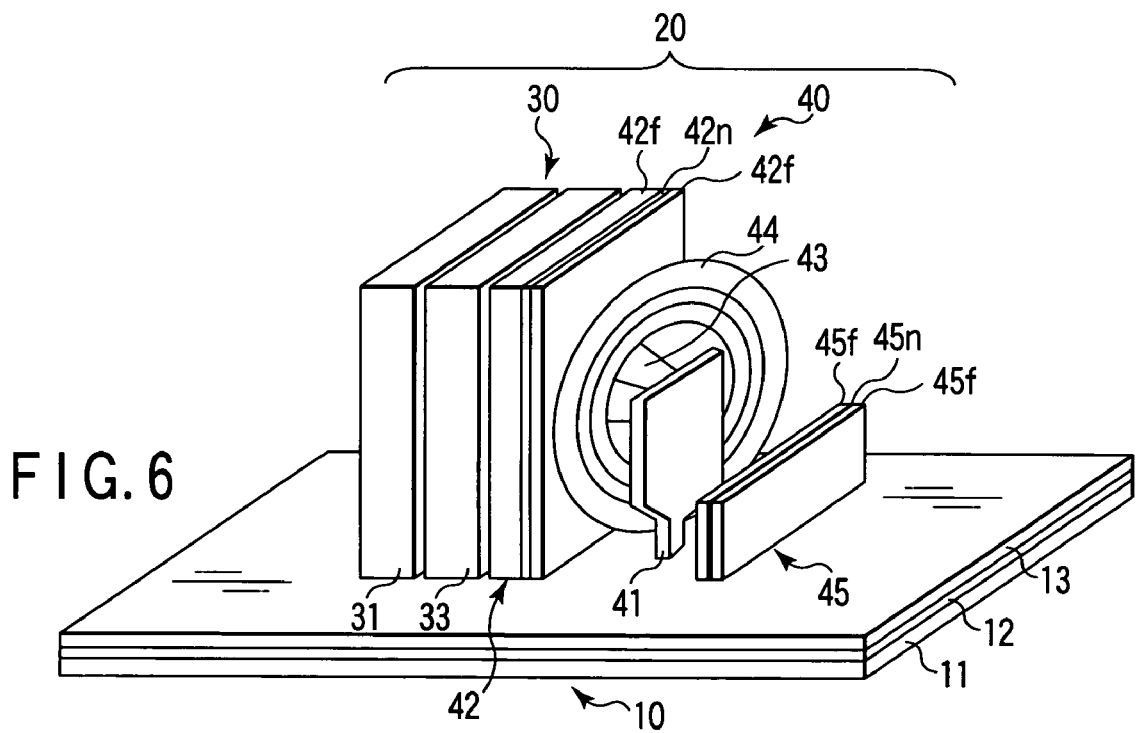
FIG. 6 is a perspective view showing the magnetic head and the magnetic disc used in the perpendicular magnetic disc apparatus according to Embodiment 2 of the present invention.
Figure 7:
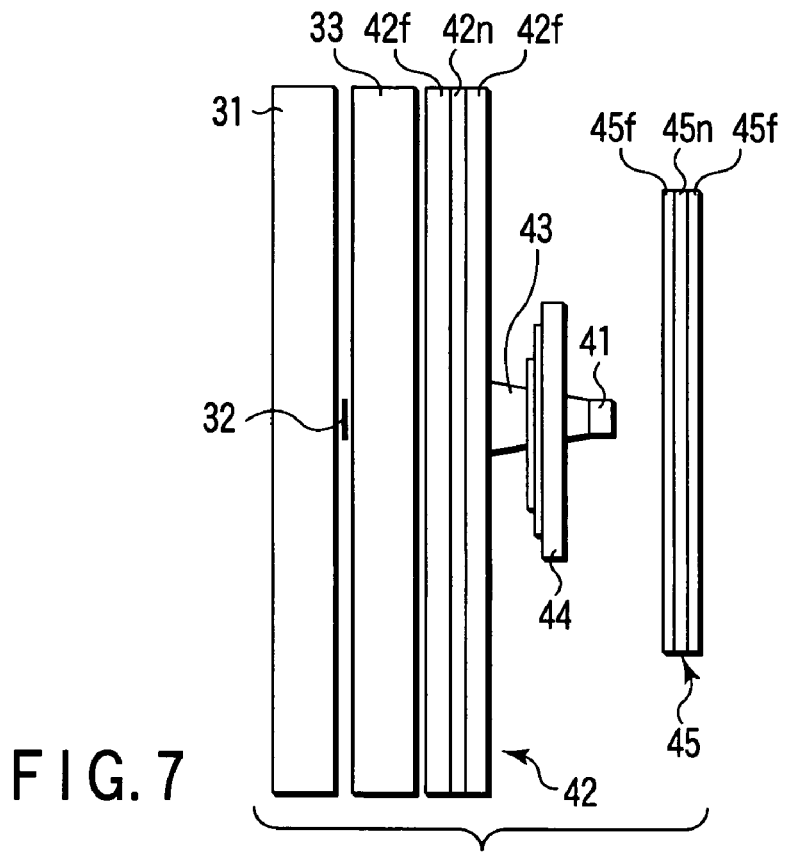
FIG. 7 is a plan view showing the magnetic head in FIG. 6 as viewed from the ABS.
Figure 8:
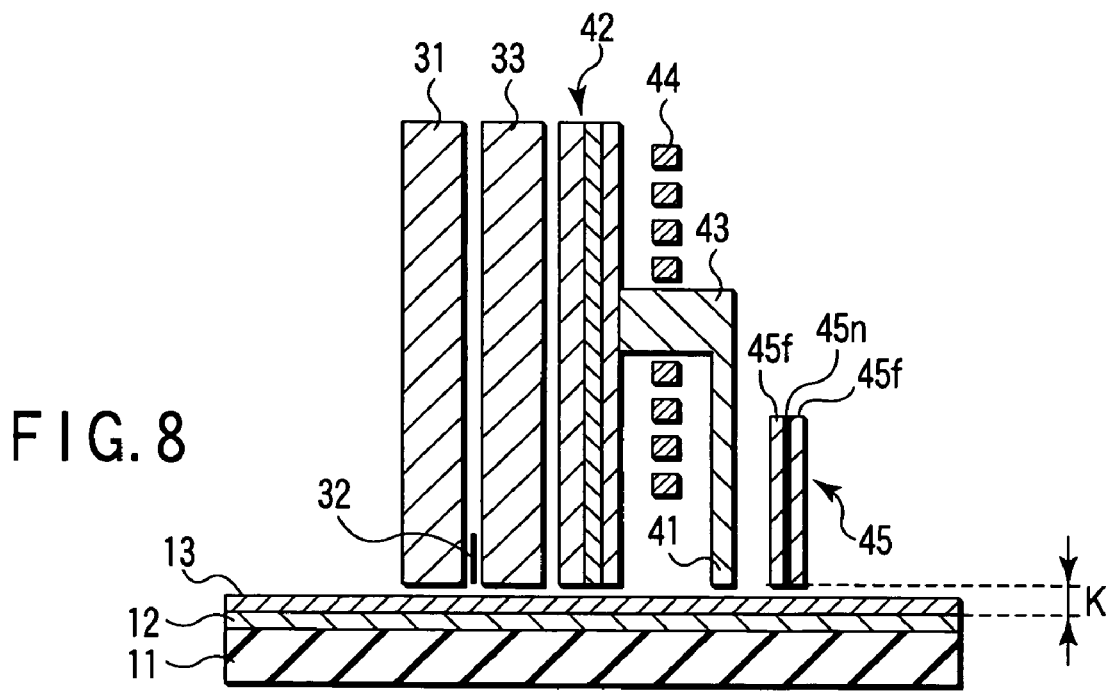
FIG. 8 is a vertical sectional view showing the magnetic head in FIG. 6, which is sectioned perpendicularly to the magnetic disc in the track direction at the center position of the main pole.

FIG. 6 is a perspective view showing the magnetic head and the magnetic disc used in the perpendicular magnetic recording apparatus according to Embodiment 2 of the present invention. FIG. 7 is a plan view showing the magnetic head in FIG. 6 as viewed from the ABS. FIG. 8 is a vertical sectional view showing the magnetic head in FIG. 6, which is sectioned perpendicularly to the magnetic disc in the track direction at the center position of the main pole.

The magnetic disc 10 includes the disc substrate 11 and the soft magnetic underlayer 12 and the perpendicular recording layer 13 having an anisotropy in a direction perpendicular to the disc plane, which are formed on the substrate 11.

The magnetic head 20, which is a separation type magnetic head, includes the read head 30 and the write head 40 which are formed separately on a head substrate (not shown). The read head 30 includes the lower shield 31, the read element 32, e.g., a giant magnetoresistive element (GMR element), and the upper shield 33. The GMR element 32 is arranged within the read gap formed between the lower shield 31 and the upper shield 33. The write head 40 includes the main pole 41 and the auxiliary pole 42 arranged on the leading side to the main pole 41, which are connected by the connecting section 43. The auxiliary pole 42 is formed into a multilayered structure in which a magnetic layer 42*f*, a nonmagnetic layer 42*n*, and another magnetic layer 42*f* are stacked. The coil 44 is wound around the connecting section 43. Further, the write shield 45 is arranged apart from the main pole 41 on the trailing side to the main pole 41 with an insulating film (not shown) interposed therebetween. The write shield 45 serves to suppress penetration of a disturbance magnetic field into the write head. The write shield 45 has a multilayered structure in which a magnetic layer 45*f*, a nonmagnetic layer 45*n* and another magnetic layer 45*f* are stacked. The write shield 45 may be recessed from the ABS of the head.

As shown in FIG. 8, the shortest distance between the surface of the soft magnetic underlayer 12 of the magnetic disc 10 and the main pole 41 or the write shield 45 is expressed by K. In order to optimize the resistance to the disturbance magnetic field, the shortest distance between the main pole 41 and the write shield 45 should be designed to be about 1 to 50 times as much as K.

In the present Embodiment, since the write shield 45 formed on the trailing side to the main pole 41 is formed into a multilayered structure in which the nonmagnetic layer 45*n* is sandwiched between the two magnetic layers 45*f* and 45*f*, it is possible to reduce the magnetic domains in the edge portions in the track width direction of the write shield 45 so as to suppress the leakage field during the recording operation, making it possible to prevent the previously recorded signals from being deteriorated and erased.

A magnetic head for Embodiment 2 shown in FIGS. 6 to 8 was fabricated as follows. The shortest distance between the main pole 41 and the write shield 45 was designed to be 2 μm. The write shield 45 had a thickness of 2 μm, a height of 8 μm, and a width of 70 μm. As a Comparative Example, a magnetic head having a structure similar to that shown in FIGS. 6 to 8, except that the write shield was formed of a single magnetic layer, was fabricated.

Figure 9:
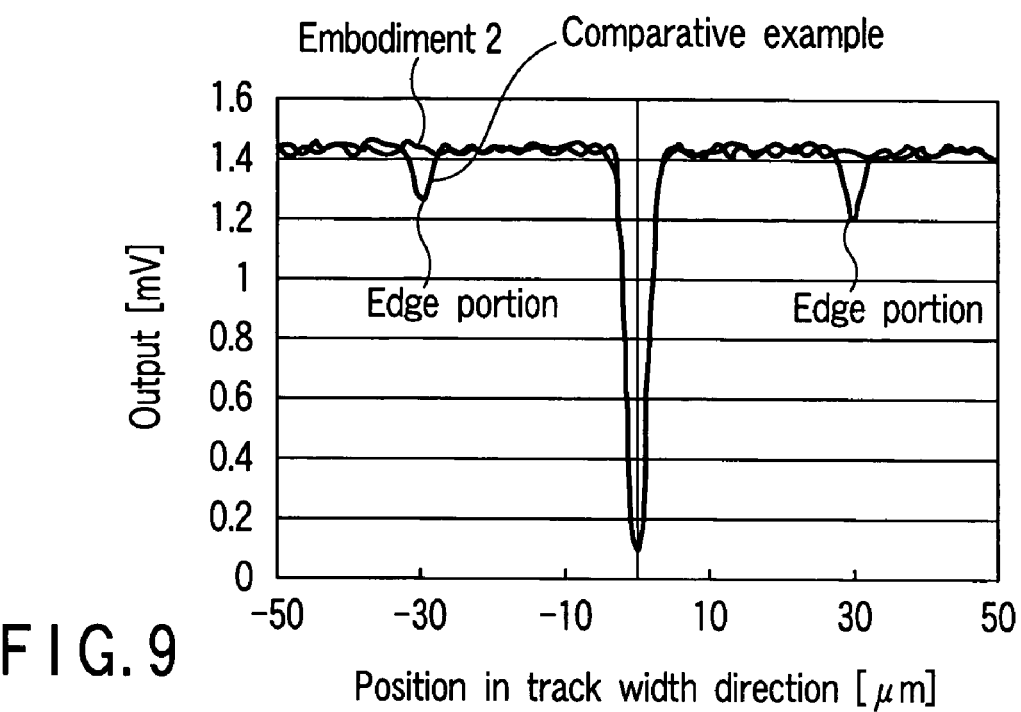
FIG. 9 is a graph showing output profiles in the track width direction where the magnetic head of Embodiment 2 or Comparative Example thereof is used.

Perpendicular magnetic recording was performed with each of the magnetic heads. The flying height of the magnetic head was controlled to provide 0.1 μm of the distance between the main pole 41 and the surface of the soft magnetic underlayer 12 of the magnetic disc 10. In the first step, signals were recorded over the entire surface of the magnetic disc 10 with a single frequency of 40 MHz. Then, signals were repeatedly recorded 1,000 times in a target track with a frequency of 150 MHz. Further, the signals recorded first were reproduced from the tracks positioned within a range of ±50 nm in the radial direction from the target track. FIG. 9 is a graph showing output profiles in the track width direction.

As shown in FIG. 9, in the case of using the magnetic head for the Comparative Example, a deterioration of about 13% in the output was observed in the tracks corresponding to the edge portions of the write shield in the track width direction while the recording was performed on the target track. On the other hand, in the case of using the magnetic head for Embodiment 2, the deterioration in the output was low, i.e., about 0.9%.

Figure 10:
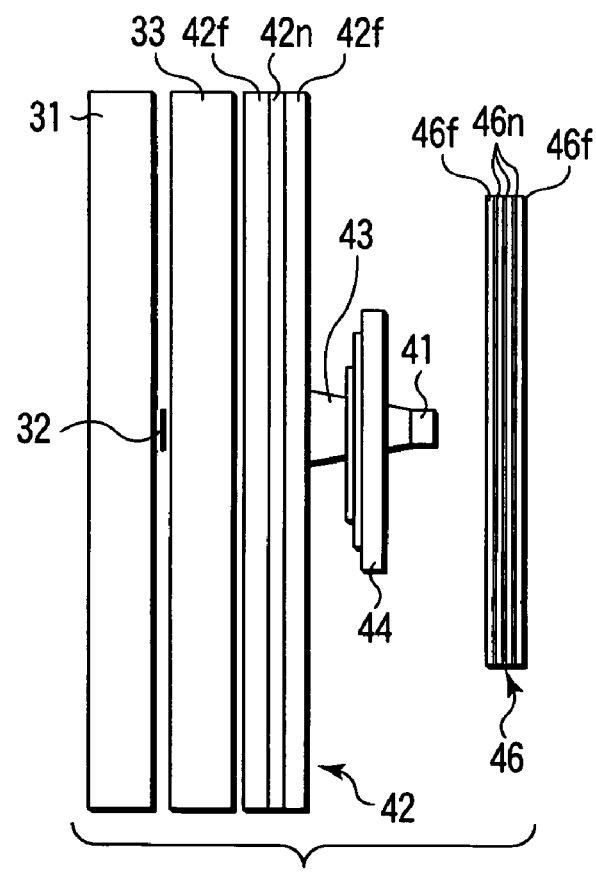
FIG. 10 is a plan view showing the magnetic head according to a modification for Embodiment 2 as viewed from the ABS.

FIG. 10 is a plan view showing the magnetic head according to a modification of Embodiment 2 as viewed from the ABS. In this modification, the write shield 46 arranged on the trailing side to the main pole 41 is formed into a stacked structure in which four magnetic layers 46f and three nonmagnetic layers 46n are alternately stacked. Where the number of magnetic layers 46f and nonmagnetic layers 46n forming the write shield 46 are increased as in the modification, it is possible to suppress more effectively the leakage field from the both edge portions of the write shield 46, compared with Embodiment 2.

Embodiment 3

Figure 11:
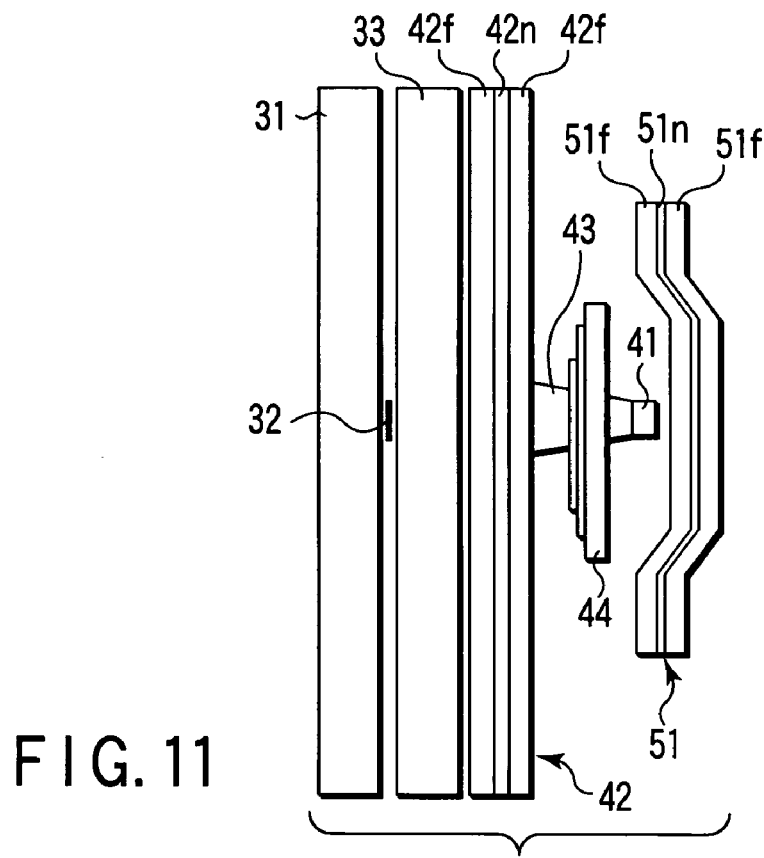
FIG. 11 is a plan view showing the magnetic head according to Embodiment 3 of the present invention as viewed from the ABS.

FIG. 11 is a plan view showing the magnetic head according to Embodiment 3 of the present invention as viewed from the ABS. The magnetic head shown in FIG. 11 is similar in structure to the magnetic head for Embodiment 2, which was described with reference to FIG. 7, except the shape of the write shield. The differences in structure between the magnetic head shown in FIG. 11 and that shown in FIG. 7 will be mainly explained in the following description.

The write shield 51 is arranged apart from the main pole 41 of the write head 40 on the trailing side to the main pole 41 with an insulating film (not shown) interposed therebetween. The write shield 51 has a multilayered structure in which a magnetic layer 51f, a nonmagnetic layer 51n and another magnetic layer 51f are stacked. In the present Embodiment, the same effect as in Embodiment 2 is also provided. That is, since the write shield 51 is formed into a multilayered structure, it is possible to reduce the magnetic domains in the edge portions in the track width direction of the write shield 51 so as to suppress the leakage field during the recording operation, making it possible to prevent the previously recorded signals from being deteriorated and erased.

Further, the write shield 51 in the present Embodiment is formed such that the both edge portions in the track width direction are inclined toward the leading side, compared with the central portion. The write shield 51 having the particular shape has a function of suppressing penetration of a disturbance magnetic field not only from the track direction but also from the track width direction. The write shield 51 may be recessed from the ABS of the head.

Results of experiments, conducted for confirming the aforementioned effect, will be described. A magnetic head for Embodiment 3 shown in FIG. 11 was fabricated as follows. The shortest distance between the main pole 41 and the write shield 51 was designed to be 1.5 µm. The write shield 51 had a thickness of 2 µm, a height of 15 µm and a width of 90 µm. As a Comparative Example, a magnetic head having a structure similar to that shown in FIG. 11, except that the write shield was formed of a single magnetic layer, was fabricated.

Figure 12:
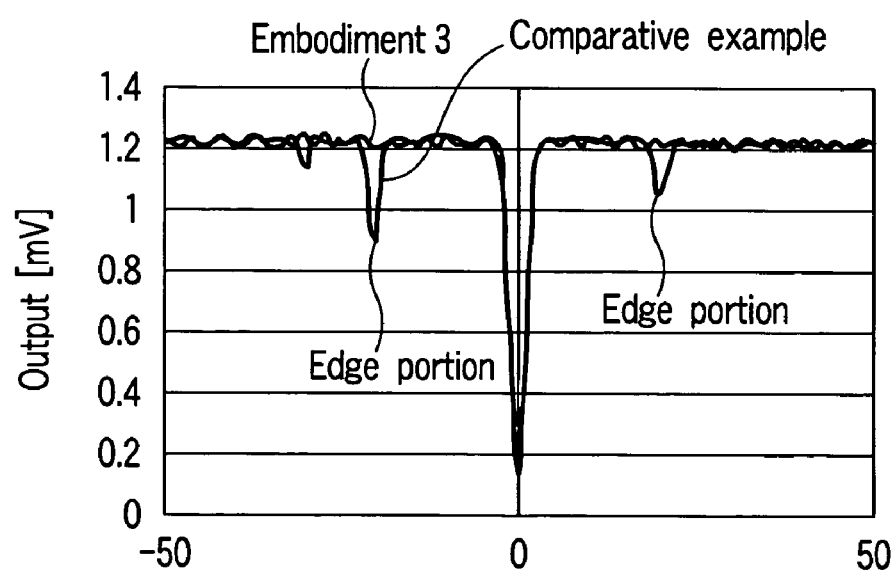
FIG. 12 is a graph showing output profiles in the track width direction where the magnetic head of Embodiment 3 or Comparative Example thereof is used.

Perpendicular magnetic recording was performed with each of the magnetic heads. The flying height of the magnetic head was controlled to provide 0.1 µm of the distance between the main pole 41 and the surface of the soft magnetic underlayer 12 of the magnetic disc 10. In the first step, signals were recorded over the entire surface of the magnetic disc 10 with a single frequency of 40 MHz. Then, signals were repeatedly recorded 1,000 times in a target track with a frequency of 150 MHz. Further, the signals recorded first were reproduced from the tracks positioned within a range of ±50 nm in the radial direction from the target track. FIG. 12 is a graph showing output profiles in the track width direction.

As shown in FIG. 12, in the case of using the magnetic head for the Comparative Example, a deterioration of about 25% in the output was observed in the tracks corresponding to the edge portions of the write shield 51, which are the inclined portions extending to the tip ends, while the recording was performed on the target track. On the other hand, in the case of using the magnetic head for Embodiment 3, the deterioration in the output was low, i.e., about 0.8%.

Figure 13:
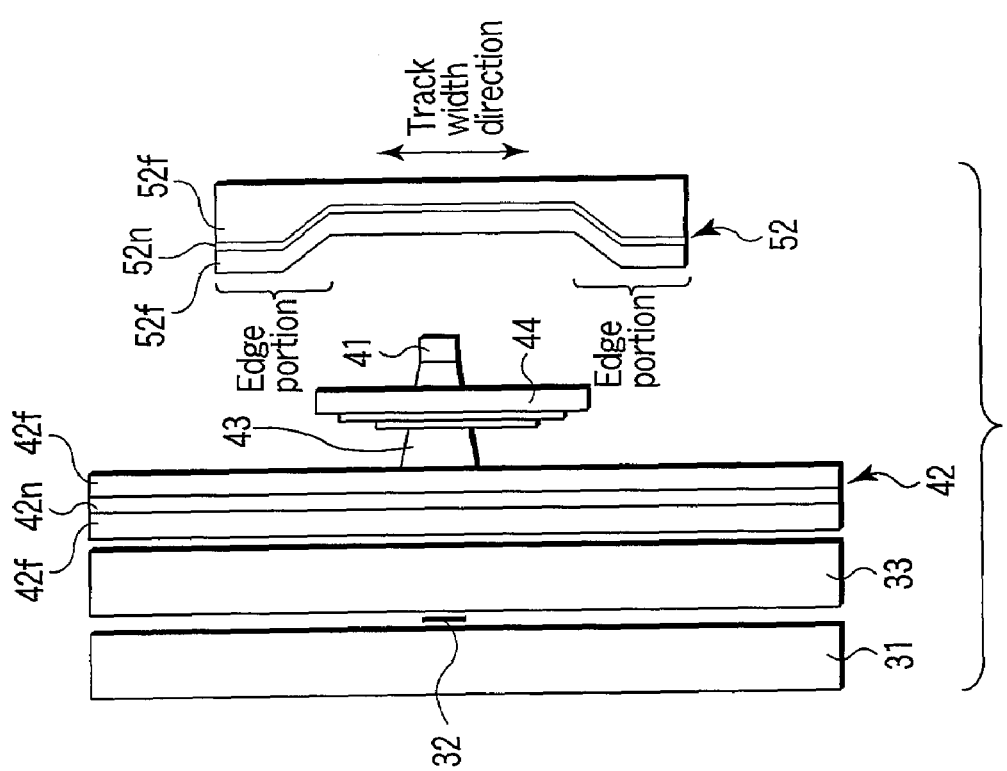
FIG. 13 is a plan view showing the magnetic head according to a modification for Embodiment 3 as viewed from the ABS.

FIG. 13 is a plan view showing the magnetic head according to a modification of Embodiment 3 as viewed from the ABS. In this modification, the write shield 52 has a stacked structure in which a magnetic layer 52f, a nonmagnetic layer 52n and another magnetic layer 52f are alternately stacked. The magnetic head shown in FIG. 13 differs from that shown in FIG. 11 in that the magnetic layer 52f on the trailing side is made thicker in each of the edge portions from the inclined portions to the tip ends of the write shield 52.

Figure 14:
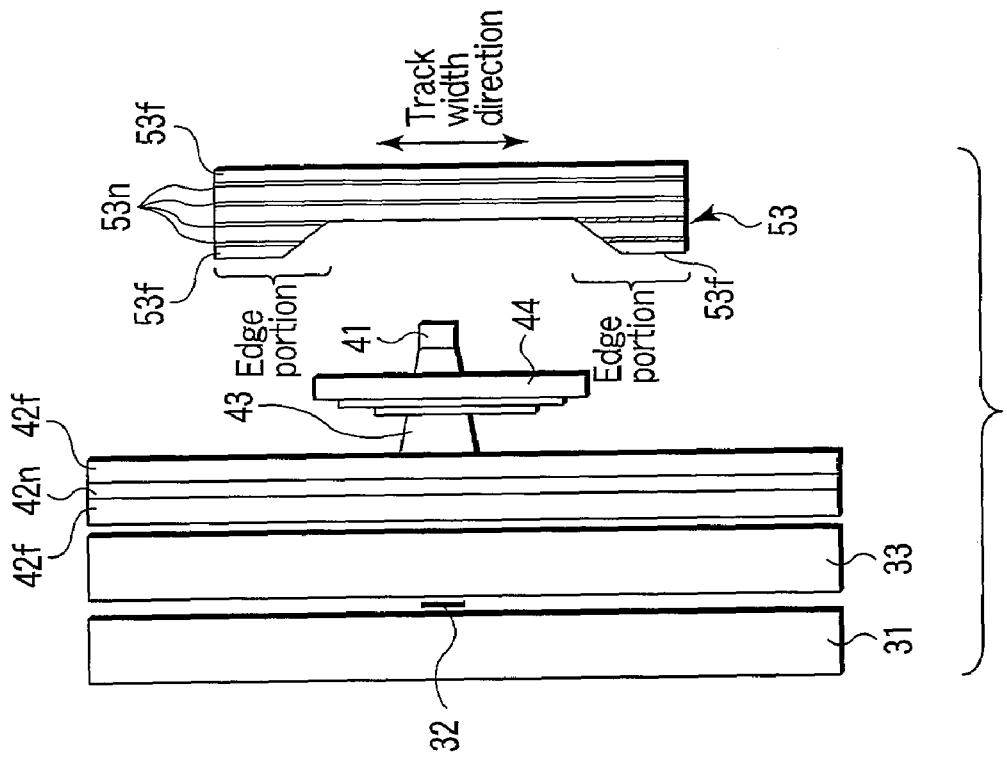
FIG. 14 is a plan view showing the magnetic head according to a modification for the magnetic head in FIG. 13 as viewed from the ABS.

FIG. 14 is a plan view showing the magnetic head according to a modification of FIG. 13 as viewed from the ABS. In this modification, the write shield 53 has a similar shape as a whole to the write shield 52 in FIG. 13, whereas the number of magnetic layers 53f and nonmagnetic layers 53n is larger than that in FIG. 13. Further, in the write shield 53, the number of magnetic layers 53f and nonmagnetic layers 53n included in each of the both edge portions are larger than that in the central portion.

Embodiment 4

Figure 15:
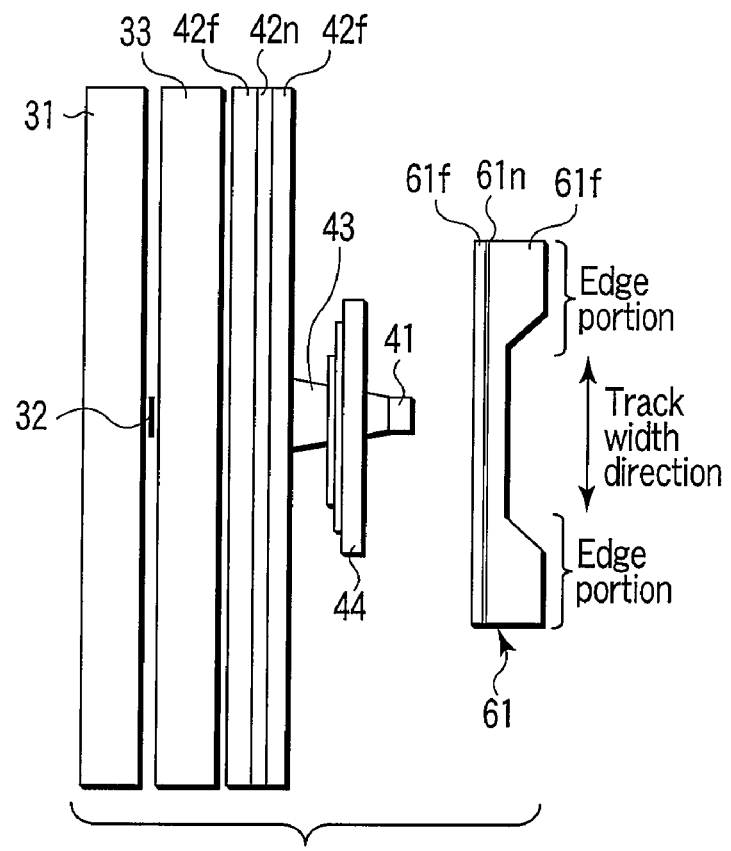
FIG. 15 is a plan view showing the magnetic head according to Embodiment 4 of the present invention as viewed from the ABS.

FIG. 15 is a plan view showing the magnetic head according to Embodiment 4 of the present invention as viewed from the ABS. The magnetic head shown in FIG. 15 is similar in structure to the magnetic head for Embodiment 2, which was described with reference to FIG. 7, except the shape of the write shield. The differences in structure between the magnetic head shown in FIG. 15 and that shown in FIG. 7 will be mainly explained in the following description.

The write shield 61 is arranged apart from the main pole 41 of the write head 40 on the trailing side to the main pole 41 with an insulating film (not shown) interposed therebetween. The write shield 61 has a multilayered structured in which a magnetic layer 61f, a nonmagnetic layer 61n and another magnetic layer 61f are stacked. Also in the present Embodiment, the same effect as in Embodiment 2 may be provided. That is, since the write shield 61 is formed into a multilayered structure, it is possible to reduce the magnetic domains in the edge portions in the track width direction of the write shield 61 so as to suppress the leakage field during the recording operation, making it possible to prevent the previously recorded signals from being deteriorated and erased.

It should also be noted that the write shield 61 in the present Embodiment is constructed such that the magnetic layer 61f alone on the trailing side is made thicker in each of the both edge portions in the track width direction than in the central portion. In the case of arranging the write shield 61 of the particular structure, the magnetic flux density is lowered in each of the both edge portions and the leakage field is made smaller than that in the case of FIG. 7. The write shield 61 may be recessed from the ABS of the head.

A magnetic head for Embodiment 4 shown in FIG. 15 was fabricated as follows. The shortest distance between the main pole 41 and the write shield 61 was designed to be 2 µm. The write shield 61 had a thickness of 1.5 µm in the thin portion and 3 µm in the thick portion, a height of 8 µm, and a width of 80 µm. As a Comparative Example, a magnetic head having a structure similar to that shown in FIG. 15, except that the write shield was formed of a single magnetic layer, was fabricated.

Figure 16:
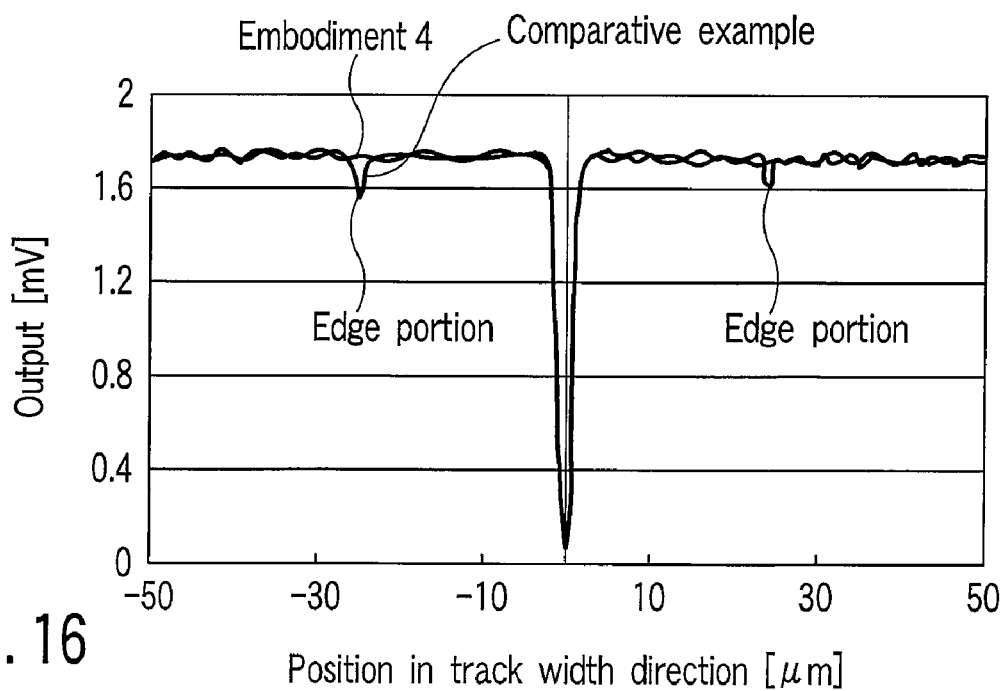
FIG. 16 is a graph showing output profiles in the track width direction where the magnetic head of Embodiment 4 or Comparative Example thereof is used.

Perpendicular magnetic recording was performed with each of the magnetic heads. The flying height of the magnetic head was controlled to provide 0.1 µm of the distance between the main pole 41 and the surface of the soft magnetic underlayer 12 of the magnetic disc 10. In the first step, signals were recorded over the entire surface of the magnetic disc 10 with a single frequency of 40 MHz. Then, signals were repeatedly recorded 1,000 times in a target track with a frequency of 150 MHz. Further, the signals recorded first were reproduced from the tracks positioned within a range of ±50 nm in the radial direction from the target track. FIG. 16 is a graph showing output profiles in the track width direction.

As shown in FIG. 16, in the case of using the magnetic head for the Comparative Example, a deterioration of about 12% in the output was observed in the tracks corresponding to the edge portions of the write shield in the track width direction while the recording was performed on the target track. On the other hand, in the case of using the magnetic head for Embodiment 4, the deterioration in the output was low, i.e., about 0.3%.

Figure 17:
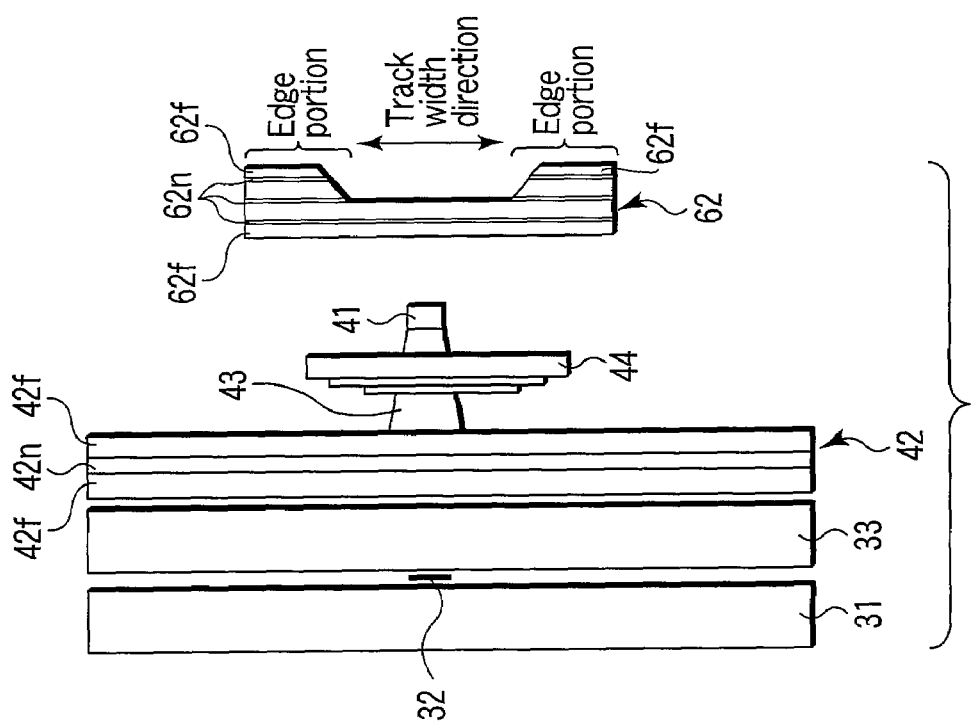
FIG. 17 is a plan view showing the magnetic head according to a modification for Embodiment 4 as viewed from the ABS.

FIG. 17 is a plan view showing the magnetic head according to a modification of Embodiment 4 as viewed from the ABS. In this modification, the write shield 62 has a similar shape as a whole to that in FIG. 15, whereas the number of magnetic layers 62$f$ and nonmagnetic layers 62$n$ is larger than that in FIG. 15. Further, in the write shield 62, the number of magnetic layers 62$f$ and nonmagnetic layers 62$n$ included in each of the both edge portions are larger than that in the central portion.

Embodiment 5

Figure 18:
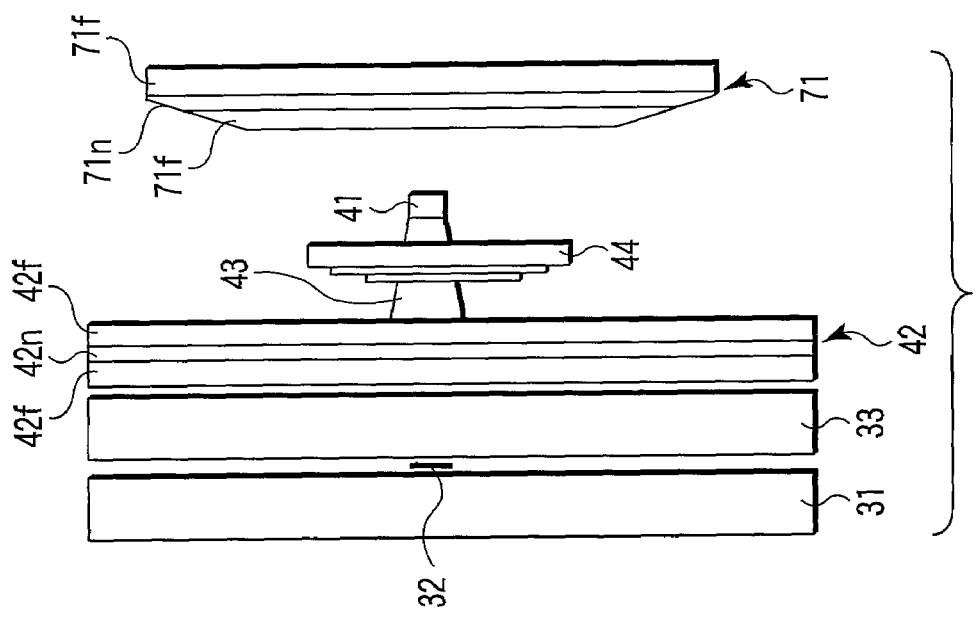
FIG. 18 is a plan view showing the magnetic head according to Embodiment 5 of the present invention as viewed from the ABS.

FIG. 18 is a plan view showing the magnetic head according to Embodiment 5 of the present invention as viewed from the ABS. The magnetic head shown in FIG. 18 is similar in structure to the magnetic head for Embodiment 2, which was described with reference to FIG. 7, except the shape of the write shield. The differences in structure between the magnetic head shown in FIG. 18 and that shown in FIG. 7 will be mainly explained in the following description.

The write shield 71 is arranged apart from the main pole 41 of the write head 40 on the trailing side to the main pole 41 with an insulating film (not shown) interposed therebetween. The write shield 71 has a multilayered structured in which a magnetic layer 71$f$, a nonmagnetic layer 71$n$ and another magnetic layer 71$f$ are stacked. Also in the present Embodiment, the same effect as in Embodiment 2 may be provided. That is, since the write shield 71 is formed into a multilayered structure, it is possible to reduce the magnetic domains in the edge portions in the track width direction of the write shield 71 so as to suppress the leakage field during the recording operation, making it possible to prevent the previously recorded signals from being deteriorated and erased.

Further, in the write shield 71 for the present Embodiment, the magnetic layer 71$f$ and the nonmagnetic layer 71$n$ are tapered in the both edge portions in the track width direction such that these portions are made thinner toward the tip ends. In the case of arranging the write shield 71 of the particular structure, it is possible to suppress the concentration of the magnetic fluxes on the edge portions so as to suppress the leakage field, though it is impossible to completely eliminate the leakage field in the edge portions. The write shield 71 may be recessed from the ABS of the head.

A magnetic head for Embodiment 5 shown in FIG. 18 was fabricated as follows. The shortest distance between the main pole 41 and the write shield 71 was designed to be 1.5 μm. The write shield 71 had a thickness of 1.5 μm in the thin portion and 3 μm in the thick portion, a height of 8 μm, and a width of 90 μm. As a Comparative Example, a magnetic head having a structure similar to that shown in FIG. 18, except that the write shield was formed of a single magnetic layer, was fabricated.

Figure 19:
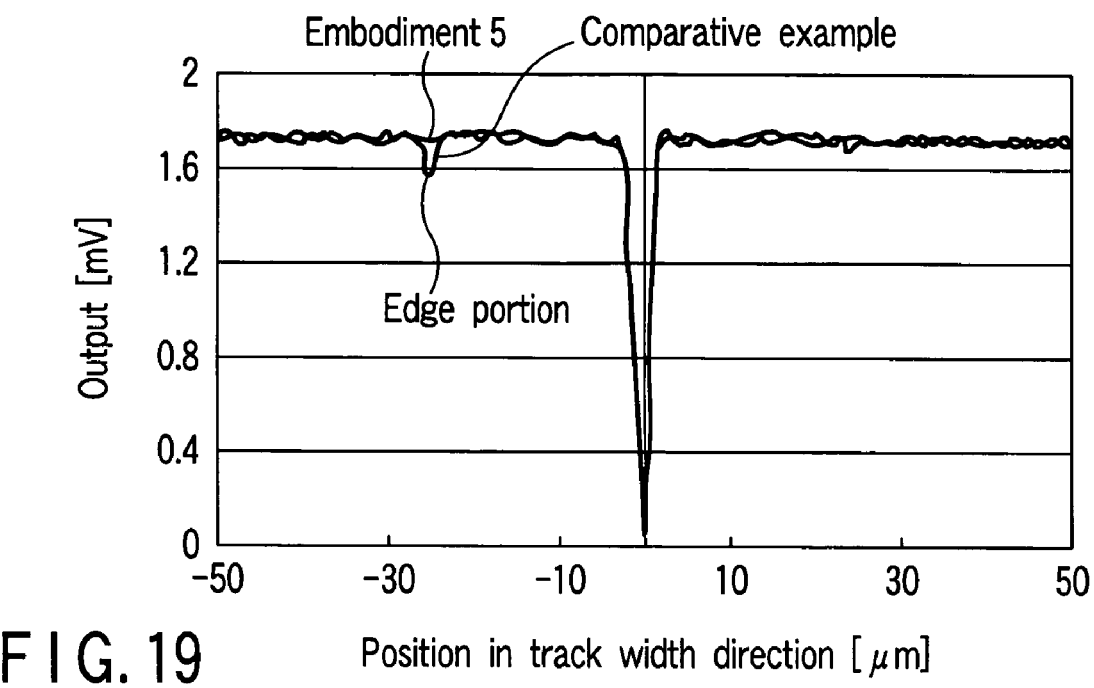
FIG. 19 is a graph showing output profiles in the track width direction where the magnetic head of Embodiment 5 or Comparative Example thereof is used.

Perpendicular magnetic recording was performed with each of the magnetic heads. The flying height of the magnetic head was controlled to provide 0.1 μm of the distance between the main pole 41 and the surface of the soft magnetic underlayer 12 of the magnetic disc 10. In the first step, signals were recorded over the entire surface of the magnetic disc 10 with a single frequency of 40 MHz. Then, signals were repeatedly recorded 1,000 times in a target track with a frequency of 150 MHz. Further, the signals recorded first were reproduced from the tracks positioned within a range of ±50 nm in the radial direction from the target track. FIG. 19 is a graph showing output profiles in the track width direction.

As shown in FIG. 19, in the case of using the magnetic head for the Comparative Example, a deterioration of about 11% in the output was observed in the tracks corresponding to the edge portions of the write shield in the track width direction while the recording was performed on the target track. On the other hand, in the case of using the magnetic head for Embodiment 5, the deterioration in the output was low, i.e., about 0.3%.

Figure 20:
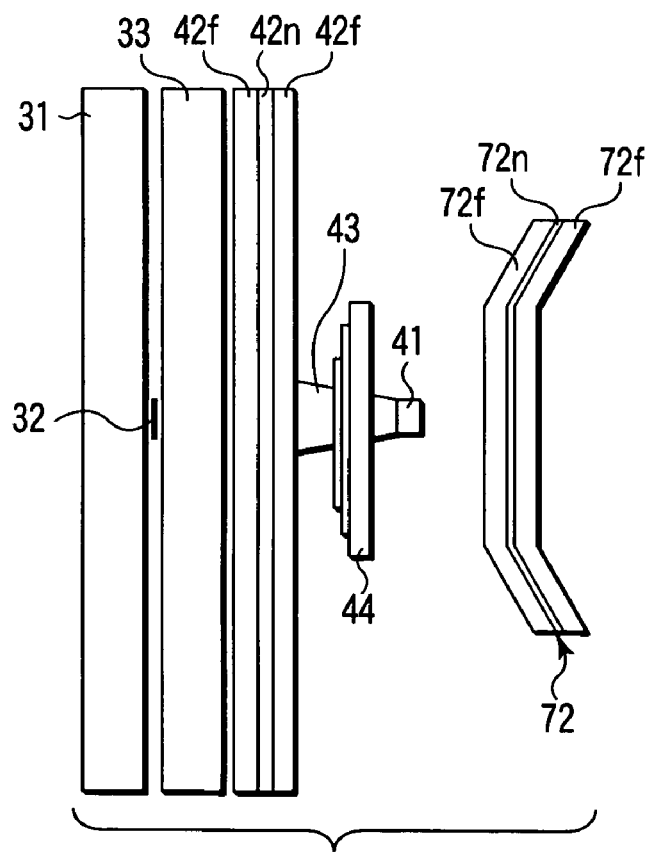
FIG. 20 is a plan view showing the magnetic head according to a modification for Embodiment 5 as viewed from the ABS.

FIG. 20 is a plan view showing the magnetic head according to a modification of Embodiment 5 as viewed from the ABS. In this modification, the both edge portions in the track width direction of the write shield 72, having a multilayered structure in which a magnetic layer 72$f$, a nonmagnetic layer 72$n$ and another magnetic layer 72$f$ are stacked, are inclined on the trailing side. In this case, the total thickness of the magnetic layers 72$f$, the nonmagnetic layer 72$n$ and the magnetic layer 72$f$ is substantially uniform over the entire region in the write shield 72.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A perpendicular magnetic recording head, comprising:
a main pole configured to generate a recording magnetic field in a perpendicular direction;
an auxiliary pole connected to the main pole on a leading side to the main pole; and
a write shield detached and uncoupled to the main pole on a trailing side to the main pole, the write shield having a multilayered structure in which a nonmagnetic layer is sandwiched between magnetic layers, and comprising a central portion and edge portions along a track width direction and having such a shape that has a thickness that is larger in each of the edge portions than that in the central portion.

2. The perpendicular magnetic recording head according to claim 1, wherein the write shield has such a shape such that a number of stacks of the magnetic layer and the nonmagnetic layer are larger in each of the edge portions than those in the central portion along the track width direction.

3. The perpendicular magnetic recording head according to claim 1, wherein the auxiliary pole comprises a multilayered structure in which a nonmagnetic layer is sandwiched between magnetic layers.

4. A magnetic disc apparatus, comprising:
a double layered perpendicular recording medium comprising a soft magnetic underlayer and a perpendicular recording layer, which are formed on a substrate; and
a perpendicular magnetic recording head comprising:
- a main pole configured to generate a recording magnetic field in a perpendicular direction,
- an auxiliary pole connected to the main pole on a leading side to the main pole, and
- a write shield detached and uncoupled to the main pole on a trailing side to the main pole, the write shield having a multilayered structure in which a nonmagnetic layer is sandwiched between magnetic layers, the write shield comprising a central portion and edge portions along a track width direction and having such a shape that has a thickness that is larger in each of edge portions than that in a central portion.

5. The magnetic disc apparatus according to claim 4, wherein the write shield has such a shape that a number of stacks of the magnetic layer and the nonmagnetic layer are larger in each of the edge portions than those in the central portion in the track width direction.

6. The magnetic disc apparatus according to claim 4, wherein the auxiliary pole comprises a multilayered structure in which a nonmagnetic layer is sandwiched between magnetic layers.

* * * * *